(12) United States Patent
Margalit (10) Patent No.: US 9,697,356 B2
(45) Date of Patent: Jul. 4, 2017

(54) DETECTION AND MITIGATION OF SIDE-CHANNEL ATTACKS

(75) Inventor: Mordehai Margalit, Zichron Ya'aqov (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 381 days.

(21) Appl. No.: 13/878,707

(22) PCT Filed: Aug. 21, 2012

(86) PCT No.: PCT/US2012/051668
§ 371 (c)(1),
(2), (4) Date: Apr. 10, 2013

(87) PCT Pub. No.: WO2014/031100
PCT Pub. Date: Feb. 27, 2014

(65) Prior Publication Data
US 2014/0059688 A1    Feb. 27, 2014

(51) Int. Cl.
*G06F 21/56* (2013.01)

(52) U.S. Cl.
CPC ................... *G06F 21/561* (2013.01)

(58) Field of Classification Search
USPC .......................................................... 726/24
See application file for complete search history.

(56) References Cited

U.S. PATENT DOCUMENTS

| 7,797,748 | B2 | 9/2010 | Zheng et al. |
|---|---|---|---|
| 8,010,667 | B2 | 8/2011 | Zhang et al. |
| 8,307,443 | B2 | 11/2012 | Wang et al. |
| 2004/0143747 | A1 | 7/2004 | Eckstein et al. |
| 2008/0091975 | A1 | 4/2008 | Kladko et al. |
| 2008/0222729 | A1 | 9/2008 | Chen et al. |
| 2009/0089879 | A1 | 4/2009 | Wang et al. |
| 2009/0158432 | A1 | 6/2009 | Zheng et al. |
| 2010/0251363 | A1 | 9/2010 | Todorovic |

(Continued)

FOREIGN PATENT DOCUMENTS

| CN | 1516829 A | 7/2004 |
|---|---|---|
| CN | 101938355 A | 1/2011 |

(Continued)

OTHER PUBLICATIONS

International Search Report and Written Opinion for PCT/US2012/051668 dated Nov. 2, 2012.

(Continued)

*Primary Examiner* — Noura Zoubair
(74) *Attorney, Agent, or Firm* — Amin, Turocy & Watson, LLP (57) ABSTRACT

Methods, systems, and computer readable storage media for preventing side-channel attacks are disclosed. A computing resource, such as a virtual machine, operating on a computing device or within a computing environment may be duplicated. Properties associated with the computing resource and the duplicate computing resource may be monitored for discrepancies. The discrepancies may be indicative of a security event, such as a virus or side-channel attack. Detected security events may be handled by replacing a computing resource with a duplicate computing resource.

21 Claims, 4 Drawing Sheets

(56) References Cited

U.S. PATENT DOCUMENTS

| | | | |
|---|---|---|---|
| 2010/0306849 A1 | 12/2010 | Zheng et al. | |
| 2010/0332578 A1 | 12/2010 | Gopal et al. | |
| 2011/0004935 A1* | 1/2011 | Moffie | G06F 21/53 |
| | | | 726/23 |
| 2011/0078681 A1 | 3/2011 | Li et al. | |
| 2011/0296412 A1* | 12/2011 | Banga et al. | 718/1 |
| 2012/0159478 A1* | 6/2012 | Spradlin | G06F 11/3636 |
| | | | 718/1 |
| 2012/0246640 A1* | 9/2012 | Marshall | G06F 9/45558 |
| | | | 718/1 |

FOREIGN PATENT DOCUMENTS

| | | | | |
|---|---|---|---|---|
| CN | 102033755 A | 4/2011 | | |
| CN | 102185928 A | 9/2011 | | |
| EP | 2 141 626 A1 * | 1/2010 | | G06F 21/00 |

OTHER PUBLICATIONS

AWS Products & Solutions: Amazon Web Services, http://aws.amazon.com (Printed from Internet Dec. 11, 2012).

Oren, Algebraic Side-Channel Analysis in the Presence of Errors, *Lecture Notes in Computer Science* (2010), 6225:428-442 (Abstract).

Packet Storm, http://packetstormsecurity.org/distributed (Printed from Internet Dec. 11, 2012).

Sherwell, CIA website hacked in attack 'claimed' by shadowy cyber group Anonymous, Telegraph Media Group Limited (Feb. 11, 2012).

Zhou et al., Side-Channel Attacks: Ten Years After Its Publication and the Impacts on Cryptographic Module Security Testing, Information Security Seminar (WS06/07) (2005).

* cited by examiner

DETECTION AND MITIGATION OF SIDE-CHANNEL ATTACKS

CROSS-REFERENCE TO RELATED APPLICATION

This application is a U.S. national stage filing under 35 U.S.C. §371 of International Application No. PCT/US2012/051668 filed on Aug. 21, 2012 entitled "Detection and Mitigation of Side-Channel Attacks," the disclosure of which is incorporated by reference in its entirety.

BACKGROUND

Cryptography is one critical security component for individual computing devices and network systems. The successful implementation of secure and efficient cryptographic protocols has engendered confidence in the general public that commercial computing networks and applications, such as shared computing resources and personal information applications, are safe. This confidence has driven the dramatic growth in both of these industries. Illustrative shared computing resources include distributed computing systems (i.e., cloud computing environments), while illustrative personal information applications include online banking and electronic commerce ("e-commerce") applications.

Nonetheless, no security system is infallible. Although conventional cryptographic systems are effective at thwarting direct attacks designed, for example, to obtain cryptographic keys or unencrypted data, they remain vulnerable to certain indirect attacks, such as side-channel attacks. In general, a side-channel attack involves deriving an encryption key based on the observable effects of computation. Side-channel attacks go beyond the plaintext and encrypted text used during the encryption process and instead focus on information involving timing (e.g., the time required to perform an operation), power consumption, sound, and electromagnetic characteristics. From this information, a side-channel attack may determine an entire encryption key one element at a time. Existing computer and network security architectures are not adequately designed to effectively detect and respond to side-channel attacks, especially without introducing prohibitive costs and inefficiencies into the very systems they are designed to protect.

SUMMARY

This disclosure is not limited to the particular systems, devices and methods described, as these may vary. The terminology used in the description is for the purpose of describing the particular versions or embodiments only, and is not intended to limit the scope.

In one embodiment, a system for preventing side-channel attacks may include a computing device and a non-transitory storage medium configured to be in communication with the computing device. The storage medium may contain one or more programming instructions that, when executed, cause the computing device to retrieve information associated with one or more virtual machines operating on the computing device. The one or more virtual machines may comprise one or more properties. One or more duplicate virtual machines comprising one or more duplicate properties may be executed within the system. The one or more duplicate virtual machines may be configured as a substantially identical instance of a counterpart virtual machine based on the information. Each duplicate virtual machine may be provided with substantially identical operational data provided to a counterpart virtual machine. The one or more duplicate properties of each duplicate virtual machine and the one or more properties of the counterpart virtual machine may be monitored for a discrepancy. The system may analyze any counterpart virtual machines exhibiting a discrepancy for one or more security events.

In another embodiment, a system for preventing side-channel attacks in a distributed computing system may include one or more computing devices and a non-transitory storage medium configured to be in communication with the one or more computing devices. The storage medium may contain one or more programming instructions that, when executed, cause the one or more computing devices to retrieve information associated with one or more virtual machines operating on the one or more computing devices. The one or more virtual machines may comprise one or more properties. One or more duplicate virtual machines comprising one or more duplicate properties may be executed within the system. The one or more duplicate virtual machines may be configured as a substantially identical instance of a counterpart virtual machine based on the information. Each duplicate virtual machine may be provided with substantially identical operational data as the counterpart virtual machine. The one or more duplicate properties of each duplicate virtual machine and the one or more properties of the counterpart virtual machine may be monitored for a discrepancy. The system may analyze counterpart virtual machines exhibiting a discrepancy for one or more security events.

In an additional embodiment, a method for preventing side-channel attacks in a distributed computing system may comprise retrieving information associated with one or more virtual machines operating on one or more computing devices arranged in a distributed computing system. The one or more virtual machines may comprise one or more properties. One or more duplicate virtual machines comprising one or more duplicate properties may be executed on the one or more computing devices. The one or more duplicate virtual machines may be configured as a substantially identical instance of a counterpart virtual machine based on the information. The method may additionally comprise providing each duplicate virtual machine with substantially identical operational data as the counterpart virtual machine. The one or more duplicate properties of each duplicate virtual machine and the one or more properties of the counterpart virtual machine may be monitored for a discrepancy. Counterpart virtual machines exhibiting a discrepancy may be analyzed for one or more security events.

In a further embodiment, a computer readable storage medium having computer readable program code configured to prevent side-channel attacks of a distributed computing system embodied therewith may comprise computer readable program code configured to retrieve information associated with one or more virtual machines operating on one or more computing devices arranged in a distributed computing system. The one or more virtual machines may comprise one or more properties. The computer readable program code may further be configured to execute, on the one or more computing devices, one or more duplicate virtual machines comprising one or more duplicate properties. The one or more duplicate virtual machines may be configured as a substantially identical instance of a counterpart virtual machine based on the information. In addition, each duplicate virtual machine may be provided with substantially identical operational data as the counterpart virtual machine. The computer readable storage medium may further have computer readable program code configured to monitor the one or more duplicate properties of each duplicate virtual machine and the one or more properties of the counterpart virtual machine for a discrepancy. Counterpart virtual machines may be analyzed for one or more security events responsive to exhibiting a discrepancy.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A "distributed computing system" refers to a computer network architecture in which computing tasks and processes are performed among various computing devices and resources. A computing device may access the distributed computing system and use applications and computing devices, such as network servers, without specifying or knowing where an application may run or where data may be located. For example, in a distributed computing system, execution of processes associated with an application may be simultaneously handled by multiple resources, such as multiple servers, processors, or processor cores. An illustrative distributed computing system is a cloud computing environment.

A "side-channel attack" refers to an unauthorized attempt to obtain information from a computing system via a side-channel. In general, a side-channel is an observable effect of computation, such as sound, time, electromagnetic properties, power consumption, or resource utilization. In a cryptographic system, a side-channel attack may attempt to obtain a cryptographic key or other secure information based on side-channel information that is neither the plaintext being encrypted nor the encrypted text generated by the encryption process. For example, a cryptographic key may be determined based on the time required to decrypt a message.

A "computing resource" refers to a physical or virtual component of a computing device or computing system. A computing resource may be used to perform a computing or networking task, such as retrieving data, performing a calculation, and transmitting data or receiving data. Alternatively, a computing resource may be used to handle computing device input/output. Illustrative computing resources include computing devices, processors, processor cores, memory, storage devices, and communication devices.

A "virtual machine" refers to a self-contained software implementation of a computing environment configured to behave as a separate computing system. A virtual machine operates using the physical hardware and software of the underlying computing devices that support its execution. However, the virtual machine emulates hardware and software such that it may appear as an individual computing device running its own operating system and using its own hardware devices.

"Configuration information" refers to information used to initiate a computing resource. The configuration information may involve information pertaining to computing resource identifiers, tasks, virtual networks, resource requirements, operating systems, applications, and hardware associated with a particular computing resource. For example, the configuration information may specify that a virtual machine operates using a specific operating system and must be allocated a certain minimum amount of processor resources. A computing system may use the configuration information when initiating execution of a computing resource to ensure the computing resource executes in an applicable operating environment.

"Properties" refer to data or operational parameters associated with a computing resource active in an operating environment. Example properties include the number of processor cycles, memory accesses, input/output (I/O) usage, power required, network communications, raw data, target addresses, number of packets, number of threads, speed of execution, delays, error information, error signals, input data, and output data. Values for the properties may be generated during execution of the computing resource and may provide information about the operation of the computing resource, such as whether the resource usage or data output is within expectations.

A "duplicate computing resource" refers to a computing resource initiated within a computing environment that is identical or substantially identical to a counterpart computing resource operating within the computing environment. The duplicate computing resource may be configured based on the configuration information of the counterpart computing resource. A set of duplicate properties may be associated with each duplicate computing resource that corresponds with the set of properties of the counterpart computing resource. In this manner, the properties of a computing resource may be compared with the duplicate properties of any duplicate computing resources. The duplicate computing resource may be configured to operate, in whole or in part, on the identical or substantially identical computing system hardware and software as a counterpart computing resource.

"Operational data" refers to data consumed by a computing process, such as a virtual machine, when operating in a computing environment. The operational data may involve information required to perform certain functions or to operate within a computing environment. For example, operational data for a virtual machine associated with an e-commerce application may include data necessary to operate within the computing environment (e.g., hardware and network device identifiers), security information, code, pages, tables, and data related to e-commerce transactions, such as product and consumer information, credit card information, and addresses.

A "security event" refers to the occurrence of a perceived or actual security threat to a computing system. The security threat may be any unauthorized attempt to access or monitor data or computing resources. Illustrative security events include viruses, worms, Trojan horses, malicious code, denial-of-service (DoS) attacks, and unauthorized monitoring, logins, or file system accesses.

A "security event response" refers to a reaction to an actual or potential security event. The security event response may be configured to prevent the security event and/or address any negative effects resulting from a security event, such as protecting user computing devices and data. For example, a response may comprise routing suspicious network traffic from a user-accessible computing resource to a shielded computing resource that may not affect computing devices connected to the computing system. In another example, a response may comprise using a security tool, such as an anti-virus application, to analyze a suspicious computing resource.

This disclosure is generally drawn, inter alia, to technologies including methods, systems, and computer readable storage media for detecting and mitigating side-channel attacks. In various embodiments, duplicate computing resources may be generated that are configured to be identical or substantially identical copies of actual computing resources. The duplicate computing resources and the actual computing resources may be compared for operational discrepancies. For example, a duplicate computing resource may comprise a duplicate virtual machine configured based on information and properties associated with an active virtual machine. Detection of discrepancies, such as output data or resource utilization discrepancies, may indicate a security event, such as a side-channel attack.

Figure 1:
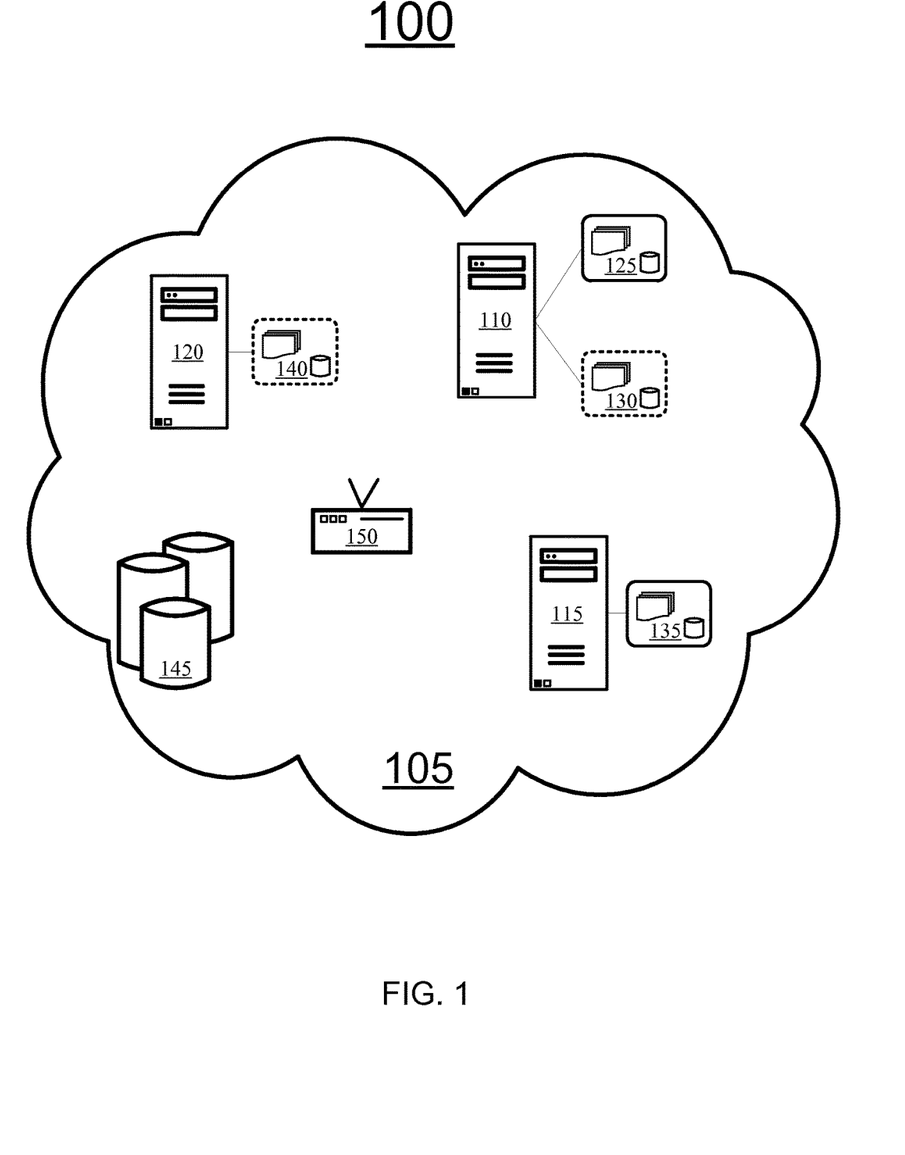
FIG. 1 depicts a block diagram for an illustrative system for preventing side-channel attacks, arranged in accordance with at least some embodiments described herein.

FIG. 1 depicts a block diagram for an illustrative system 100 for preventing side-channel attacks, arranged in accordance with at least some embodiments described herein. As shown in FIG. 1, the system 100 may be associated with a distributed computing system 105, such as a cloud computing system. One or more computing devices 110, 115, 120 may be arranged within the distributed computing system 105. In one embodiment, the computing devices 110, 115, 120 may comprise network servers, for example, configured to process requests, including application, Internet, network communication, and data requests. The computing devices 110, 115, 120 may be physical, virtual, or some combination thereof. Databases 145 may be arranged within the distributed computing system 105 for storing, handling, processing, and otherwise managing data. The distributed computing system 105 may additionally comprise one or more networking appliances 150, such as routers, switches, gateway computing devices, and other virtual or physical devices configured to manage network traffic and/or data.

As shown in FIG. 1, one or more computing resources 125, 135 may be active within the distributed computing system 105. For instance, computing resources 125, 135 may include, without limitation, an application, a database, a virtual machine, a virtual processor, a virtual network connection, a virtual server, or a virtual memory. The computing resources 125, 135 may operate on or be associated with computing devices 110, 115.

According to certain embodiments, one or more duplicate computing resources 130, 140 may be operative within the distributed computing system 105. The duplicate computing resources 130, 140 may be configured as identical or substantially identical copies of the computing resources 125, 135. For example, duplicate computing resource 130 may be a copy of computing resource 125, while duplicate computing resource 140 may be a copy of computing resource 135.

In one embodiment, the duplicate computing resources 130, 140 may be configured to operate in a different computing environment than their counterpart computing resources 125, 135. Certain embodiments provide that a different computing environment comprises the duplicate computing resources 130, 140 using at least one separate computing element than the counterpart computing resources 125, 135. For example, a separate computing element may include, without limitation, a processor, a processor core, a network communication device, a memory or memory area, an execution time, an Internet Protocol (IP) address, and virtual versions thereof. For example, the duplicate computing resource 140 and its counterpart computing resource 135 may be executed on different computing devices 115, 120. In another example, the duplicate computing resource 130 and its counterpart computing resource 125 may be executed on the same computing device 110, but may use different processors or different cores within the same processor.

In one embodiment, each of the computing resources 125, 135 may be associated with configuration information for initiating the computing resources 125, 135. For example, configuration information may include, but is not limited to, computing resource identifiers, resource requirements, tasks, operating systems, applications, and associated hardware. The system 100 may use the configuration information to initiate duplicate computing resources that operate under identical or substantially identical operating conditions as the counterpart computing resources. For example, the configuration information for a virtual machine may specify the operating system the virtual machine will execute and the physical hardware where the virtual machine will operate. Although the duplicate virtual machine and the counterpart virtual machine may operate on different physical hardware, the configuration information may be used to ensure that the duplicate virtual machine operates on equivalent hardware, such as a processor with equivalent processing power, speed, and availability.

In one embodiment, the computing resources 125, 135 and the duplicate computing resources 130, 140 may be associated with one or more properties. The properties may provide operational information associated with the computing resources. Illustrative and non-restrictive examples of properties include the number of processor cycles, memory accesses, input/output (I/O) usage, power required, network communications, input data, and output data. Values for the properties may be generated during execution of the computing resource and may provide information about the operation of the computing resource, such as resource usage or data output, and whether the information is within expectations.

In one embodiment, the duplicate computing resources 130, 140 may be associated with identical or substantially identical properties that are associated with the counterpart computing resources 125, 135. For example, a virtual machine may be associated with output data and network communication properties that may provide information regarding the data being produced by the virtual machine and any network traffic associated with the virtual machine. The duplicate virtual machine configured as a copy of the virtual machine may also be associated with output data and network communication properties configured to provide identical or substantially identical information pertaining to the duplicate virtual machine.

Figure 2:
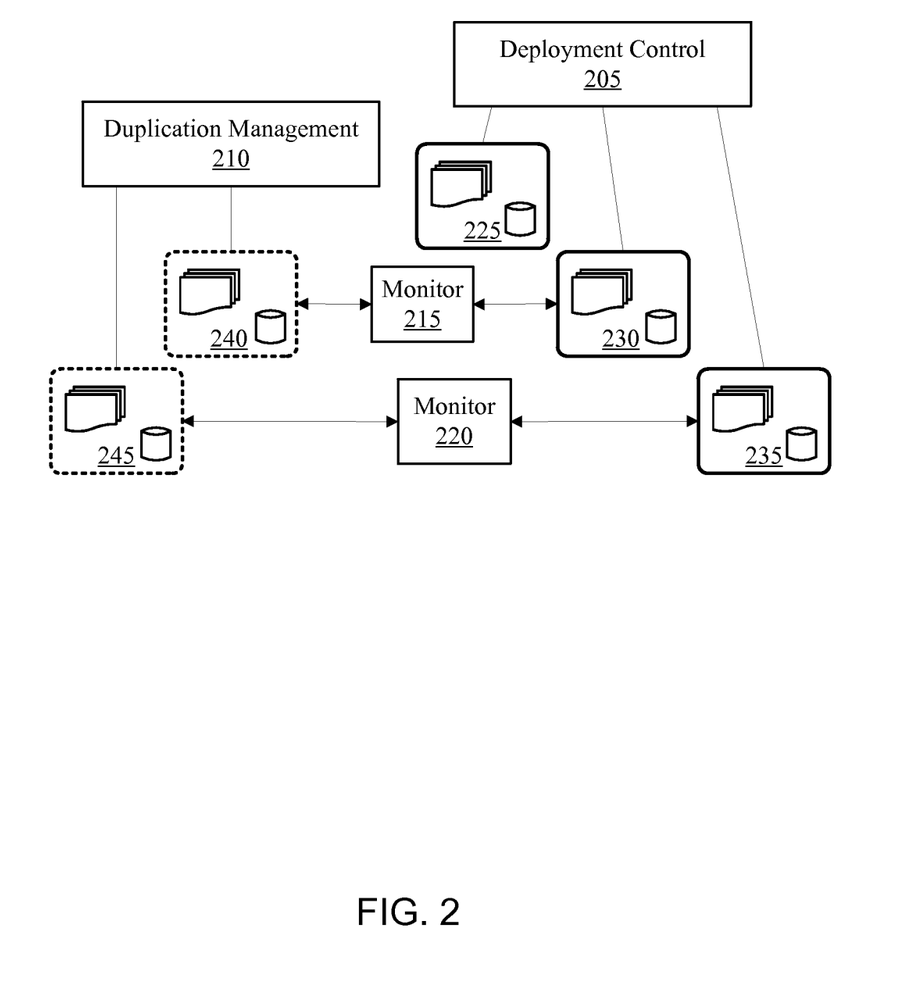
FIG. 2 depicts a block diagram for another illustrative system for preventing side-channel attacks, arranged in accordance with at least some embodiments described herein.

FIG. 2 depicts a block diagram for another illustrative system for preventing side-channel attacks, arranged in accordance with at least some embodiments described herein. As shown in FIG. 2, a deployment control module 205 may be configured or operate to deploy computing resources 225, 230, 235. A duplication management module 210 may be configured or operate to initiate duplicate computing resources 240, 245. For example, the duplication management module 210 may access information associated with the computing resources 225, 230, 235, such as properties and configuration information. Based on the properties and the configuration information, the duplication management module 210 may generate a copy of one or more of the computing resources 230, 235 and deploy the copies as the duplicate computing resources 240, 245. In the example embodiment depicted in FIG. 2, the computing resource 230 is the counterpart of duplicate computing resource 240, and the computing resource 235 is the counterpart of duplicate computing resource 245. Embodiments are not limited to one duplicate computing resource for each computing resource, as each computing resource may be associated with multiple duplicate computing resources. In one embodiment, the duplication management module 210 may operate to ensure that each of the duplicate computing resources 240, 245 receive the same information as their counterpart computing resources 230, 235, such as data, network traffic, and/or computing resource capabilities.

As illustrated in FIG. 2, the monitor modules 215, 220 may be associated with each of the duplicate computing resources 240, 245 and each of the counterpart computing resources 230, 235. For instance, as shown in FIG. 2, the monitor module 215 is associated with the duplicate computing resource 240 and the counterpart computing resource 230, and the monitor module 220 is associated with the duplicate computing resource 245 and the counterpart computing resource 235. The monitor modules 215, 220 may be configured or operate to observe, track, record, examine, compare, process, analyze, or otherwise interact with activity and/or information associated with the duplicate computing resources 240, 245 and the counterpart computing resources 230, 235. Although FIG. 2 depicts each of the monitor modules 215, 220 as being associated with one of the duplicate computing resources 240, 245 and one of the counterpart computing resources 230, 235, embodiments are not so limited, as a monitor module may monitor multiple duplicate computing resources and/or multiple counterpart computing resources.

In one embodiment, the duplicate computing resources 240, 245 may be initiated at substantially the same time as the counterpart computing resources 230, 235. However, the duplication management module 210 may initiate the duplicate computing resources 240, 245 at a later time than the counterpart computing resources 230, 245. For example, launching the duplicate computing resources 240, 245 at a later time than the counterpart computing resources 230, 245 may allow the monitor modules 215, 220 to observe differences in properties or duplicate properties that may be directly or indirectly affected by changes in the computing environment over time (e.g., high network traffic, number of data transfers, etc.).

In one embodiment, the monitor modules 215, 220 may monitor duplicate properties associated with the duplicate computing resources 240, 245 and properties associated with the counterpart computing resources 230, 235. As the duplicate computing resources 240, 245 are configured as substantially identical copies of the counterpart computing resources 230, 235, the values and/or data associated with the duplicate properties should substantially match values and/or data associated with the properties. The monitor modules 215, 220 may compare the duplicate properties and the properties, for example, to determine if there are any discrepancies between the values and/or data associated with the duplicate properties and the properties.

In one embodiment, a discrepancy between the values and/or data associated with the duplicate properties and the properties may indicate a security event is occurring or has occurred within the computing environment hosting the computing resources 230, 235. For example, a particular property associated with output data may be configured to have a value below a specified threshold. If the value for a corresponding duplicate property associated with one of the duplicate computing resources 240, 245 is below the threshold, while the value for the property is above the threshold for one of the counterpart computing resources 230, 235, one or more of the monitor modules 215, 220 may categorize the variance as a discrepancy. In one embodiment, the duplicate computing resources 240, 245 may receive simulated (e.g., "safe") network traffic and/or data, while the counterpart computing resources 230, 235 may be receive actual network traffic and/or data. As such, the monitor modules 215, 220 may determine that the counterpart computing resources 230, 235 may have been compromised by the actual network traffic and/or data based on the value of the property being above the threshold, while, in comparison, the value for the corresponding duplicate property is below the threshold.

Figure 3:
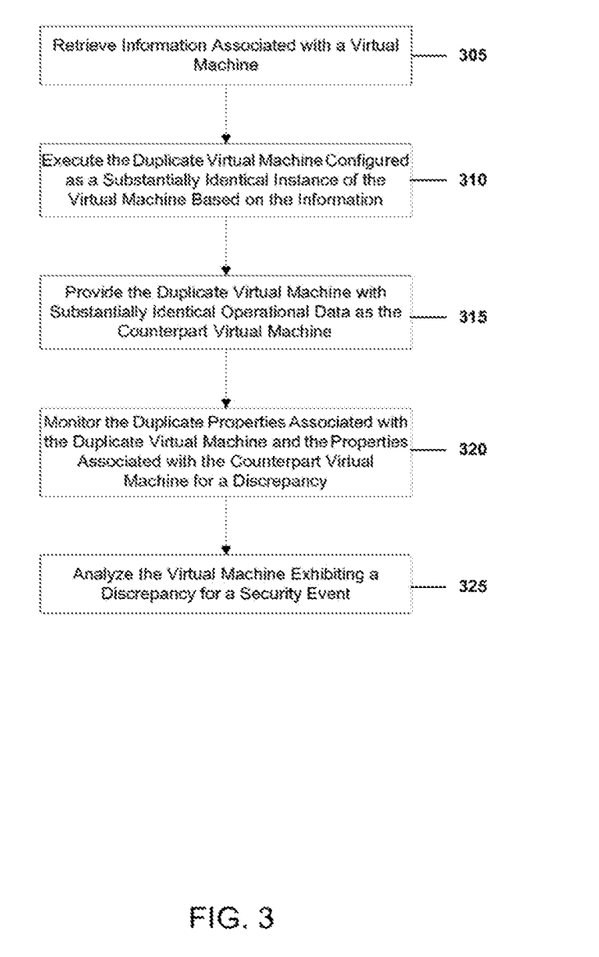
FIG. 3 depicts a flow diagram for an illustrative method for preventing side-channel attacks using virtual machine computing resources, arranged in accordance with at least some embodiments described herein.

FIG. 3 depicts a flow diagram for an illustrative method for preventing side-channel attacks using virtual machine computing resources, arranged in accordance with at least some embodiments described herein. The illustrative method of FIG. 3 may be performed, for example, by the computing device 400 depicted in FIG. 4, which is described in more detail below in reference to FIG. 4. In addition, the illustrative method of FIG. 3 may include one or more operations, functions, or actions as illustrated by one or more of blocks 305, 310, 315, 320, and/or 325. The operations described in blocks 305 through 325 may also be stored as computer-executable instructions in a computer-readable medium, such as the system memory 406 of the computing device 400 depicted in FIG. 4. Although illustrated as discrete blocks, various blocks may be divided into additional blocks, combined into fewer blocks, or eliminated, depending on the desired implementation.

Beginning at block 305, the computing device may retrieve information associated with a virtual machine. For example, configuration information used to initiate the virtual machine may be obtained from one or more other computing devices associated with the virtual machine, such as one or more other computing devices hosting the virtual machine or initiating the virtual machine (e.g., computing devices 110 and 115 illustrated in FIG. 1). The information may be stored, for instance, as a file, database record, or other electronic data storage unit within a distributed computing environment hosting the virtual machine. The information retrieved at block 305 may be information used to configure the virtual machine for operation within the distributed computing environment, including operating systems, applications, data, or hardware associated with the virtual machine. Block 305 may be followed by block 310.

At block 310, the computing device may execute the duplicate virtual machine as a substantially identical instance of the virtual machine based on the information retrieved at block 305. For example, a duplication management module 210, illustrated in FIG. 2, may request and retrieve information pertaining to the virtual machine. This information may be used to generate an identical or substantially identical instance of the virtual machine, which may be initiated for execution within the distributed computing environment, such as the distributed computing system 105 illustrated in FIG. 1. As such, each duplicate virtual machine may be associated with a counterpart virtual machine that is a complement of the duplicate virtual machine. For example, the duplicate virtual machine and the counterpart virtual machine may be identical or substantially identical with respect to certain operational characteristics, including, without limitation, operating systems, computing services (e.g., Internet services, e-commerce services), applications, data operations, security configurations, virtual hardware resources, physical hardware resources (e.g., both may provide virtual storage space based on the same physical storage device or functionally equivalent storage device), network communications, and combinations thereof. Block 310 may be followed by block 315.

At block 315, the computing device may provide the duplicate virtual machine with substantially identical operational data as the counterpart virtual machine. For instance, the duplicate virtual machine and the counterpart virtual machine may receive substantially identical input data and/or network traffic. In one embodiment, the duplicate virtual machine may receive substantially identical operational data, simulated operational data (e.g., data generated to emulate the operational data being received by the counterpart virtual machine), and combinations of actual and simulated data. Providing the duplicate virtual machine with substantially identical operational data in block 315 facilitates, inter alia, comparing the duplicate virtual machine with its counterpart virtual machine within substantially identical operating conditions, such as substantially identical input data and/or network traffic.

In one embodiment, the operational data provided to the duplicate virtual machine in block 315 may be time delayed. In this manner, the impact of time on properties (e.g., data parameters, network communications) associated with the duplicate virtual machine may be assessed, for example, by a monitoring module, such as monitoring modules 215 and 220 illustrated in FIG. 2. In one embodiment, the virtual machine may be associated with multiple duplicate virtual machines. In addition, each duplicate virtual machine may be selectively chosen to receive time-delayed operational data. In another embodiment, the selection of the virtual machine to receive time-delayed operational data may be random, sequential, or some combination thereof. Block 315 may be followed by block 320.

At block 320, the computing device may monitor the duplicate properties associated with the duplicate virtual machine and the properties associated with the counterpart virtual machine for a discrepancy. Each virtual machine may be associated with one or more properties related to its operation. Illustrative and non-restrictive examples of properties may include a number of processor cycles, a number and/or a location of memory accesses, input/output (I/O) usage, power consumption, hardware interaction data (e.g., data related to processors, adjacent cores in a processor, storage devices, memory, computing devices, and combinations thereof), network transmission data, output data, application data (e.g., which applications are active and information associated with execution of each application), and operating system data. In accordance with at least some embodiments described herein, the duplicate virtual machine may be configured to have an identical or substantially identical set of properties (i.e., the "duplicate properties") as its counterpart virtual machine. The properties and the duplicate properties may be monitored at block 320 to determine whether there are any discrepancies between them.

In one embodiment, discrepancies between the properties and the duplicate properties may indicate the presence of one or more security events, such as a side-channel attack. Non-limiting examples of security events include a Trojan horse, virus, worm, malicious code, internal or external decryption or monitoring, and denial-of-service (DoS) attack.

A security event, such as a side-channel attack, may cause detectable changes in the operation of a computing resource, such as the virtual machine. As such, if duplicate virtual machines are configured to be operationally identical or substantially identical to the counterpart virtual machine and to operate within an identical or substantially identical computing environment, than any discrepancy between the duplicate virtual machine and the counterpart virtual machine may indicate the presence of a security event that is affecting one or the other. For example, a Trojan horse placed in a core before activation of the virtual machine and/or duplicate virtual machine may effect processor cycles, I/O, and memory accesses. In another example, an adjacent processor core attempting to decrypt or attack an instance core may show up in the duplicate virtual machine but not in the virtual machine, or vice versa. In a further example, external decryption or monitoring attempts may appear in I/O or virtual machine deployment control. Block 320 may be followed by block 325.

At block 325, the computing device may analyze the virtual machine exhibiting a discrepancy for a security event. For example, the virtual machine associated with a discrepancy may be scrutinized for viruses, Trojan horses, worms, other malicious code, a denial-of-service (DoS) attack, monitoring, or other unauthorized usage or access. If a security event is found, one or more security event responses may be initiated by the computing device. For example, the suspect virtual machine may be monitored for suspicious network traffic and the suspicious traffic may be rerouted, such as to one or more duplicate virtual machines initiated to handle the suspicious traffic. In another example, a security tool, such as anti-virus software, may scan the suspect virtual machine for malicious code or other unauthorized activity.

In one embodiment, the suspect virtual machine may be replaced by a duplicate virtual machine that has not been compromised or is not suspected of being compromised by a security event. In this manner, computing devices interacting with the suspect virtual machine may continue to operate without a reduction or loss of service, while the suspect virtual machine may be isolated and unavailable during security event analysis.

Figure 4:
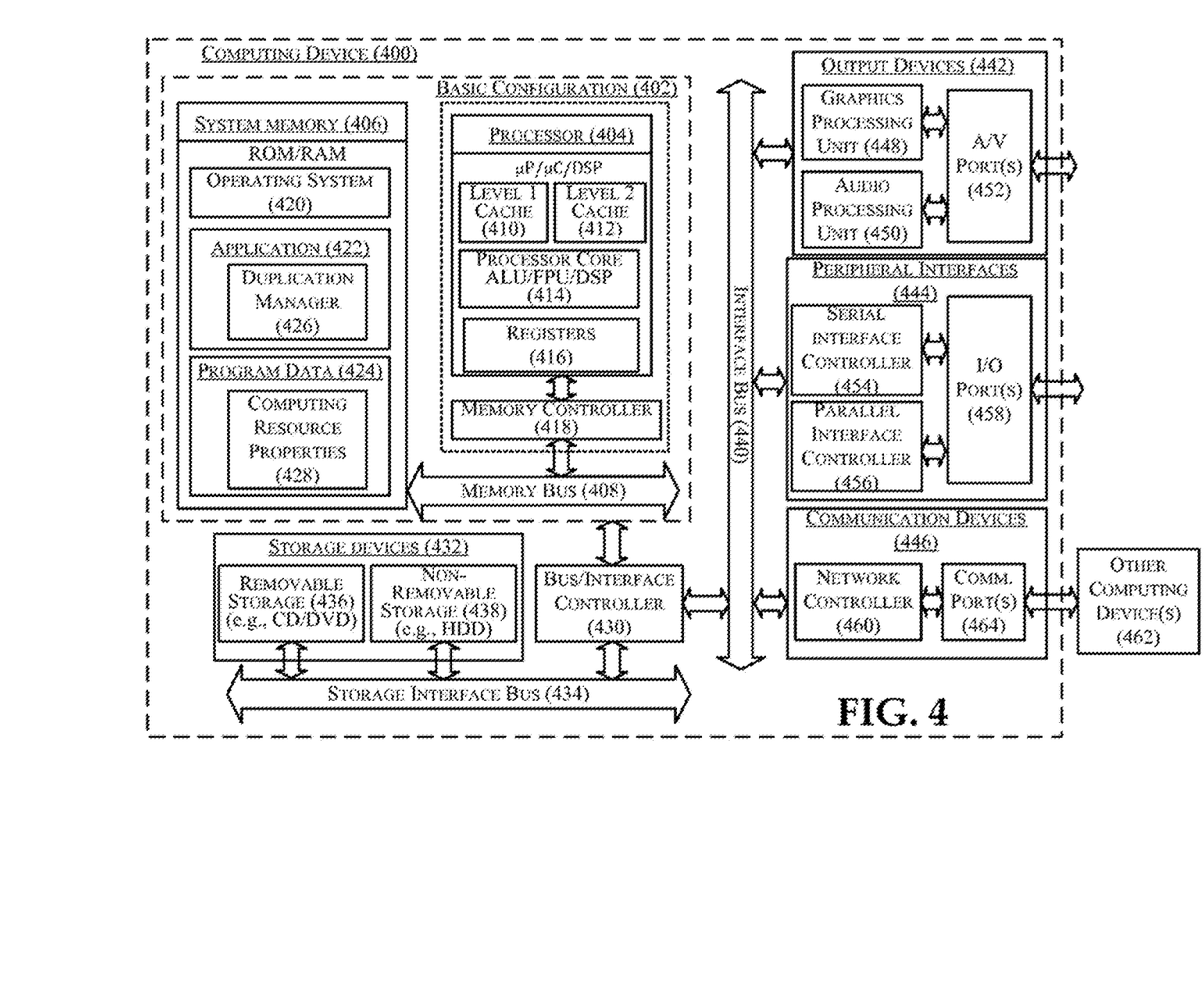
FIG. 4 depicts a block diagram of an illustrative computing device that may be used to contain or implement program instructions for detecting and mitigating side-channel attacks, arranged in accordance with at least some embodiments described herein.

FIG. 4 is a block diagram illustrating an example computing device 400 that may be used to contain or implement program instructions for detecting and mitigating side-channel attacks, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (μP), a microcontroller (μC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a duplication manager 426 that is arranged to initiate and manage duplicate computing resources as described in reference to FIGS. 1-3. Program data 424 may include computing resource properties 428 of computing resources and duplicate computing resources that may be useful for comparing the operation of a duplicate computing resource and a counterpart computing resource as is described herein. In some embodiments, application 422 may be arranged to operate with program data 424 on operating system 420 such that operational discrepancies between a duplicate computing resource and a counterpart computing resource may be determined and analyzed as provided herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

EXAMPLES

Example 1

Detecting a Side-Channel Attack and Analyzing a Virtual Machine Suspected of Being Compromised by the Side-Channel Attack A server computing device will have duplicate physical hardware resources, including processors, storage devices, memory, and network devices. The server computing device will execute virtual machines as part of an e-commerce software platform. The virtual machines will be configured to perform functions for the e-commerce software platform, such as handling product data and customer transactions. Each virtual machine will have the following properties that provide information about the execution of the virtual machine on the server computing device: input/output (I/O) usage, memory accesses, and power required. The e-commerce software platform will use configuration information to initialize the virtual machines with an operating system, application, data sources, and virtual hardware resources.

A virtual machine will be implemented via VMWare vSphere®, operating using the Linux® operating system, and executing a data application for managing available products for an e-commerce website. The virtual machine will be associated with a processor of the server computing device. The virtual machine will receive operational data related to purchased products and product inventory.

A security event management application will operate on the server computing device for handling security events associated with the virtual machines. The security event management application will obtain the configuration information for each virtual machine initiated by the e-commerce software platform. A duplicate virtual machine will be deployed by the security event management application for each virtual machine operating according to the configuration information, except that each duplicate machine will operate using at least one separate hardware device than its counterpart virtual machine.

A duplication management module operating in the security event management application will obtain the configuration information for the virtual machine. The configuration information will be used by the duplication management module to initiate the duplicate virtual machine operating using the same operating system and executing the same data application as the virtual machine. The duplicate virtual machine will operate using a different processor than the processor specified in the configuration information. The duplication management application will operate to provide the same operational data to the duplicate virtual machine. A monitor module operating in the security event management application will monitor the input/output (I/O) usage, memory accesses, and power required properties associated with the virtual machine and the duplicate virtual machine.

The monitor module will detect a discrepancy involving memory accesses and I/O usage between the duplicate virtual machine and the virtual machine. More specifically, the memory accesses for the virtual machine are in a different location of memory and the I/O usage for the virtual machine is much higher compared to the duplicate virtual machine. The monitor module will flag the virtual machine as having a discrepancy and will respond by requesting a scan of the virtual machine with an anti-virus application operating on the server computing device.

Example 2

Detecting and Mitigating a Denial-of-Service (DoS) Side-Channel Attack in a Cloud Computing Environment Multiple server computing devices will operate in a cloud computing environment (hereinafter, the "cloud"). The cloud computing environment will execute virtual machines as part of an Internet-based data storage platform. The virtual machines will be configured to perform functions for the data storage platform, such as handling data storage, retrieval, and display requests. Each virtual machine will have the following properties that provide information about the execution of the virtual machines on the server computing devices: input/output (I/O) usage, memory accesses, power required, and number of processor cycles. The data storage platform will use configuration information to initialize the virtual machines with an operating system, application, data sources, and virtual hardware resources.

A virtual machine will be implemented via Amazon® Elastic Compute Cloud (EC2), operating using the Microsoft Windows Server® operating system, and executing a data application for retrieving data based on user data requests. The data application will operate as a website interface for users to retrieve data stored in the cloud. The virtual machine will be associated with a server computing device of the cloud. The virtual machine will receive operational data related to user data requests, data storage locations, and user data access privileges.

A security event management application will operate on one of the server computing devices within the cloud for handling security events associated with the virtual machines. The security event management application will obtain the configuration information for each virtual machine initiated by the data storage platform. A duplicate virtual machine will be deployed for each virtual machine operating according to the configuration information, except that each duplicate virtual machine will operate using a different server computing device than its counterpart virtual machine.

A duplication management module operating in the security event management application will obtain the configuration information for the virtual machine. The configuration information will be used by the duplication management module to initiate a duplicate virtual machine operating using the same operating system and executing the same data application as the virtual machine. The duplicate virtual machine will operate using a different server computing device than the server computing device specified in the configuration information. The duplication management application will operate to provide the same operational data to the duplicate virtual machine. A monitor module operating in the security event management application will monitor the input/output (I/O) usage, memory accesses, number of processor accesses, and power required properties associated with the virtual machine and the duplicate virtual machine.

The monitor module will detect a discrepancy involving I/O usage between the duplicate virtual machine and the virtual machine. More specifically, the I/O usage for the virtual machine is extremely high compared to the duplicate virtual machine, such that the virtual machine cannot adequately respond to user requests. The monitor module will flag the virtual machine as having a discrepancy and will analyze the virtual machine. The monitor module will determine that the virtual machine is undergoing a denial-of-service (DoS) attack based on an unusual number and pattern of data requests of the virtual machine. In response, the security event management application will re-route suspicious traffic and will generate a second duplicate virtual machine. The second duplicate virtual machine will replace the virtual machine and handle user requests previously handled by the virtual machine. In this manner, the DoS attack will be resolved as users will interact with the second virtual machine in an identical manner as with the virtual machine.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one and one or more" to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A device, comprising:
 a non-transitory storage medium configured to be in communication with the device, wherein the non-transitory storage medium comprises one or more programming instructions that, when executed, cause the device to at least:
  retrieve information associated with a first virtual machine operating on the device, the first virtual machine comprising a processing property associated with the first virtual machine;
  execute a second virtual machine comprising a duplicate processing property, wherein the second virtual machine and the first virtual machine are configured with a corresponding operating condition based on the information;
  provide the second virtual machine and the first virtual machine with operational data that comprises network traffic data associated with a distributed computing system;

determine a discrepancy between the duplicate processing property of the second virtual machine and the processing property of the first virtual machine based on first execution data generated by the second virtual machine in response to the network traffic data provided to the second virtual machine and second execution data generated by the first virtual machine in response to the network traffic provided to the first virtual machine;

replace the first virtual machine with a duplicate third virtual machine and initiate analysis of the first virtual machine for a security event associated with unauthorized usage of the first virtual machine in response to a determination, based on the network traffic data provided to the second virtual machine and the first virtual machine, that a first number of processor cycles associated with the duplicate processing property of the second virtual machine does not match a second number of processor cycles associated with the processing property of the first virtual machine; and initiate a security event reaction responsive to the security event and the determination that the first number of processor cycles does not match the second number of processor cycles, wherein the security event reaction comprises routing suspicious data traffic to the first virtual machine and routing non-suspicious data traffic to the duplicate third virtual machine.

2. The device of claim 1, wherein the information associated with the first virtual machine comprises virtual machine configuration information.

3. The device of claim 1, wherein the non-transitory storage medium comprises one or more further programming instructions that, when executed, cause the device to execute the second virtual machine in a different computing environment than the first virtual machine, and wherein the second virtual machine and the first virtual machine operate using at least one separate computing resource.

4. The device of claim 3, wherein the at least one separate computing resource comprises at least one of a processor, a processor core, an execution time, or an Internet Protocol address.

5. The device of claim 1, wherein the processing property and the duplicate processing property are further associated with at least one of respective numbers of processor steps, respective communication data, respective numbers of memory accesses, respective input/output usage data, respective power data, respective input data, respective output data, or respective device hardware interaction data.

6. The device of claim 1, wherein the security event comprises at least one of a Trojan horse, a virus, a worm, malicious code, unauthorized monitoring, hacking attempts, an unexpected virtual machine operation, a denial-of-service attack, or an external decryption attempt.

7. The device of claim 1, wherein a value of the processing property is generated during execution of a computing resource associated with the first virtual machine.

8. A method, comprising:
retrieving, by a system comprising a processor, information associated with a first virtual machine operating on a device arranged in a distributed computing system, the first virtual machine comprising a computing property;

initiating, by the system, execution of a second virtual machine comprising a duplicate computing property, the initiating comprising configuring the second virtual machine and the first virtual machine with a corresponding operating condition based on the information;

providing, by the system, the second virtual machine and the first virtual machine with a corresponding version of operational data associated with the distributed computing system;

comparing, by the system, the duplicate computing property of the second virtual machine to the computing property of the first virtual machine based on first processing data generated by the second virtual machine and second processing data generated by the first virtual machine in response to the corresponding version of the operational data associated with the distributed computing system;

replacing, by the system, the first virtual machine with a duplicate third virtual machine and analyzing, by the system, the first virtual machine for a security event in response to a determination, based on the corresponding version of the operational data associated with the distributed computing system, that a first total amount of processor cycles associated with the duplicate computing property of the second virtual machine does not match a second total amount of processor cycles associated with the computing property of the first virtual machine; and initiating, by the system, a security event reaction responsive to the determination that the first total amount of processor cycles does not match the second total amount of processor cycles, wherein the initiating the security event reaction comprises routing suspicious traffic to the first virtual machine and routing non-suspicious traffic to the duplicate third virtual machine.

9. The method of claim 8, wherein the retrieving the information comprises retrieving configuration information associated with the first virtual machine.

10. The method of claim 8, further comprising executing, by the system, the second virtual machine in a different computing environment than the first virtual machine.

11. The method of claim 8, wherein the executing comprises executing the second virtual machine using a first computing resource that is different than a second computing resource associated with the first virtual machine, the first computing resource comprising at least one of a processor, a processor core, an execution time, or an Internet Protocol (IP) address.

12. The method of claim 8, wherein the comparing comprises comparing the first total amount of processor cycles to the second total amount of processing cycles.

13. The method of claim 8, wherein the analyzing comprises analyzing the first virtual machine for at least one of a Trojan horse, a virus, a worm, malicious code, unauthorized monitoring, hacking attempts, unexpected virtual machine operation, denial-of-service attack, or external decryption attempt.

14. The method of claim 8, wherein the comparing comprises comparing a first number of memory accesses associated with the second virtual machine to a second number of memory accesses associated with the first virtual machine.

15. A computer readable storage device having computer readable program code that, in response to execution, cause a system comprising a processor to perform operations, comprising:
retrieving information associated with a first virtual machine operating on a device arranged in a distributed computing system, the first virtual machine comprising a processing property;

executing a second virtual machine comprising a corresponding processing property, the second virtual machine and the first virtual machine being configured with a corresponding operating condition based on the information;

sending, to the second virtual machine and the first virtual machine, corresponding operational data that comprises network data for the distributed computing system;

comparing the corresponding processing property of the second virtual machine to the processing property of the first virtual machine based on the network data for the distributed computing system;

replacing the first virtual machine with a duplicate third virtual machine and analyzing the first virtual machine for a security event in response to a determination, based on the network data for the distributed computing system, that a first number of processor steps associated with the corresponding processing property of the second virtual machine does not match a second number of processor steps associated with the processing property of the first virtual machine; and initiating a security event reaction in response to the security event, wherein the initiating comprises routing suspicious data traffic to the first virtual machine and routing non-suspicious data traffic to the duplicate third virtual machine.

16. The computer readable storage device of claim 15, wherein the information associated with the first virtual machine comprises configuration information for the first virtual machine.

17. The computer readable storage device of claim 15, wherein the operations further comprise executing the second virtual machine in a different computing environment than the first virtual machine.

18. The computer readable storage device of claim 15, wherein the second virtual machine and the first virtual machine operate using different computing resources.

19. The device of claim 1, wherein the operational data that is provided to the second virtual machine is a time-delayed version of the operational data that is provided to the first virtual machine.

20. The device of claim 1, wherein the operational data is indicative of a data storage location for data stored in a database in communication with the device via a network device.

21. The device of claim 1, wherein the operational data is indicative of an access privilege for data stored in a database in communication with the device via a network device.

* * * * *

UNITED STATES PATENT AND TRADEMARK OFFICE
CERTIFICATE OF CORRECTION

Page 1 of 1

PATENT NO. : 9,697,356 B2
APPLICATION NO. : 13/878707
DATED : July 4, 2017
INVENTOR(S) : Margalit et al.

It is certified that error appears in the above-identified patent and that said Letters Patent is hereby corrected as shown below:

In Column 15, Line 45, delete ""at least one and one or more"" and insert -- "at least one" and "one or more" --, therefor.

In Column 15, Line 48, delete ""a" or an" and insert -- "a" or "an" --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*